(12) United States Patent
Brown et al.

(10) Patent No.: US 6,354,977 B1
(45) Date of Patent: Mar. 12, 2002

(54) TRANSFER CASE WITH HYDRAULIC RANGE SHIFT AND ADAPTIVE CLUTCH CONTROL

(75) Inventors: David Brown, deceased, late of Diss (GB), by Janet Brown, the administrator; Richard E. Eastman, Central Square, NY (US); Sankar K. Mohan, Syracuse, NY (US); Nancy Mintonye, Kirkville, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/514,057

(22) Filed: Feb. 25, 2000

Related U.S. Application Data
(60) Provisional application No. 60/123,502, filed on Mar. 9, 1999.

(51) Int. Cl.[7] ........................... F16H 37/08; B60K 17/35
(52) U.S. Cl. ..................... 475/204; 475/322; 180/349
(58) Field of Search .................. 475/204, 199, 475/317, 322; 180/247, 249

(56) References Cited

U.S. PATENT DOCUMENTS

| | | | |
|---|---|---|---|
| 4,770,280 A | | 9/1988 | Frost |
| 5,323,871 A | | 6/1994 | Wilson et al. |
| 5,655,986 A | | 8/1997 | Wilson et al. |
| 5,688,202 A | * | 11/1997 | Bowen ........................ 475/199 |
| 5,697,861 A | | 12/1997 | Wilson |
| 5,700,222 A | * | 12/1997 | Bowen ........................ 475/204 |
| 5,702,321 A | | 12/1997 | Bakowski et al. |
| 5,836,847 A | * | 11/1998 | Pritchard ..................... 475/204 |
| 5,845,754 A | * | 12/1998 | Weilant ..................... 192/53.35 |
| 5,875,865 A | * | 3/1999 | Wakahara et al. ....... 180/249 X |
| 5,902,205 A | | 5/1999 | Williams |
| 5,916,051 A | | 6/1999 | Schleuder et al. |
| 5,947,858 A | | 9/1999 | Williams |

\* cited by examiner

Primary Examiner—Charles A Marmor
Assistant Examiner—Ha Ho
(74) Attorney, Agent, or Firm—Harness, Dickey & Pierce P.L.C.

(57) ABSTRACT

A power transfer system for a motor vehicle is disclosed to include a transfer case having a clutch assembly arranged to control speed differentiation and torque biasing across an interaxle differential, a hydraulic clutch actuation system operable to control actuation of the clutch assembly, sensors for detecting and generating sensor signals indicative of various dynamic and operational characteristics of the vehicle, and a controller for controlling the hydraulic clutch actuation system in response to the sensor signals. Upon the occurrence of traction loss, the clutch assembly is automatically actuated for limiting interaxle slip while transferring increased drive torque to the non-slipping driveline. Under a preferred control scheme, the actuated condition of the clutch assembly is controllably modulated between its non-actuated and fully-actuated limits for automatically varying the magnitude of speed differentiation and torque biasing across the interaxle differential in response to changes in the operational characteristics of the motor vehicle. As a further feature of the present invention, the transfer case can be equipped with a gearset and a hydraulically-actuated range shift mechanism for permitting on-the-move shifting between high-range and low-range drive modes.

14 Claims, 8 Drawing Sheets

TRANSFER CASE WITH HYDRAULIC RANGE SHIFT AND ADAPTIVE CLUTCH CONTROL

This application claims the benefit of priority application Ser. No. 60/123,502 filed Mar. 9, 1999.

BACKGROUND OF THE INVENTION

The present invention relates to a power transfer system for controlling the distribution of drive torque between the front and rear drivelines of a four-wheel drive vehicle.

Due to increased consumer demand for four-wheel drive vehicles, a plethora of different power transfer systems are currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a "mode" shift mechanism can be selectively actuated by the vehicle operator for directly coupling the non-driven wheels to the driven wheels for establishing a part-time four-wheel drive mode. As will be appreciated, motor vehicles equipped with such part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770,280 to Frost.

Alternatively, it is known to use "on-demand" power transfer systems for automatically directing power to the non-driven wheels, without any input or action on the part of the vehicle operator, when traction is lost at the driven wheels. Modernly, the "on-demand" feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al wherein the electronically-controlled clutch assembly is operable for automatically controlling the amount of drive torque transferred to the non-driven wheels as a function of the wheel speed difference (i.e., the wheel slip) between the driven and non-driven wheels.

As a further alternative, some vehicles are equipped with full-time power transfer systems having a transfer case equipped with a center differential that functions to permit interaxle speed differentiation while transferring drive torque to both of the front and rear drivelines. To minimize loss of traction due to wheel slippage, many full-time transfer cases are also equipped with a clutch assembly for limiting speed differentiation and biasing the torque transferred across the center differential. For example, full-time transfer cases are disclosed in commonly-owned U.S. Pat. No. 5,697,861 to Wilson and U.S. Pat. No. 5,702,321 to Bakowski et al. which are respectively equipped with mechanically-actuated and hydraulically-actuated clutch assemblies for controllably modulating the drive torque delivered across the center differential to the front and rear drivelines.

While the power transfer systems disclosed above have advanced the technology associated with four-wheel drive motor vehicles, a need still exists to develop alternative arrangements which continue to provide improvements in packaging, response time and cost.

SUMMARY OF THE INVENTION

It is therefore an object of the present invention to provide improved power transfer systems for use in four-wheel drive vehicles having a transfer case equipped with a clutch assembly for controlling the torque delivered to the front and rear drivelines in response to changing vehicle conditions.

In accordance with one specific object of the present invention, a full-time power transfer system is disclosed to include a transfer case having a clutch assembly arranged to control speed differentiation and torque biasing across an interaxle differential, a hydraulic clutch actuation system operable to control actuation of the clutch assembly, sensors for detecting and generating sensor signals indicative of various dynamic and operational characteristics of the vehicle, and a controller for controlling the hydraulic clutch actuation system in response to the sensor signals. Upon the occurrence of traction loss, the clutch assembly is automatically actuated for limiting interaxle slip while transferring increased drive torque to the non-slipping driveline. Under a preferred adaptive control scheme, the actuated condition of the clutch assembly is controllably modulated between its non-actuated and fully-actuated limits for automatically varying the magnitude of speed differentiation and torque biasing across the interaxle differential in response to changes in the dynamic and operational characteristics of the vehicle.

In accordance with a related object of the present invention, the full-time power transfer system may further include means for establishing a locked four-wheel drive mode in addition to the full-time four-wheel drive mode. To this end, a mode select mechanism is provided for permitting the vehicle operator to select one of the full-time and locked four-wheel drive modes and generate a mode signal indicative thereof. The mode signal is delivered to the controller for use in controlling actuation of the clutch assembly. When the locked four-wheel drive mode is selected, the clutch assembly is fully-actuated for preventing speed differentiation across the interaxle differential and thereby delivering non-differentiated drive torque to the front and rear drivelines. When the full-time four-wheel drive mode is selected, the actuated condition of the clutch assembly is controllably modulated between its non-actuated and fully-actuated limits. Thus, the power transfer system of the present invention offers the vehicle operator the option of selecting the specific four-wheel drive mode best-suited for operating the motor vehicle during normal or adverse road conditions as well as for off-road use.

Pursuant to another specific object of the present invention, an on-demand power transfer system is provided for establishing an on-demand four-wheel drive mode and includes a transfer case having the clutch assembly arranged to automatically transfer drive torque from the primary output shaft to the secondary output shaft. As a related object, the on-demand power transfer system can include a mode select mechanism for permitting selection of one of the on-demand four-wheel drive mode and a part-time four-wheel drive mode. When the part-time four-wheel drive mode is selected, the clutch assembly is fully-actuated for locking the secondary output shaft for common rotation with the primary output shaft.

As a further feature of the present invention, the transfer cases can be equipped with a gearset and a hydraulically-actuated range shift mechanism for permitting "on-the-move" shifting between high-range and low-range drive modes.

BRIEF DESCRIPTION OF THE DRAWINGS

Further objects, features and advantages of the present invention will become apparent to those skilled in the art from analysis of the following written description, the accompanying drawings and the appended claims in which:

DETAILED DESCRIPTION OF THE INVENTION

Figure 1:
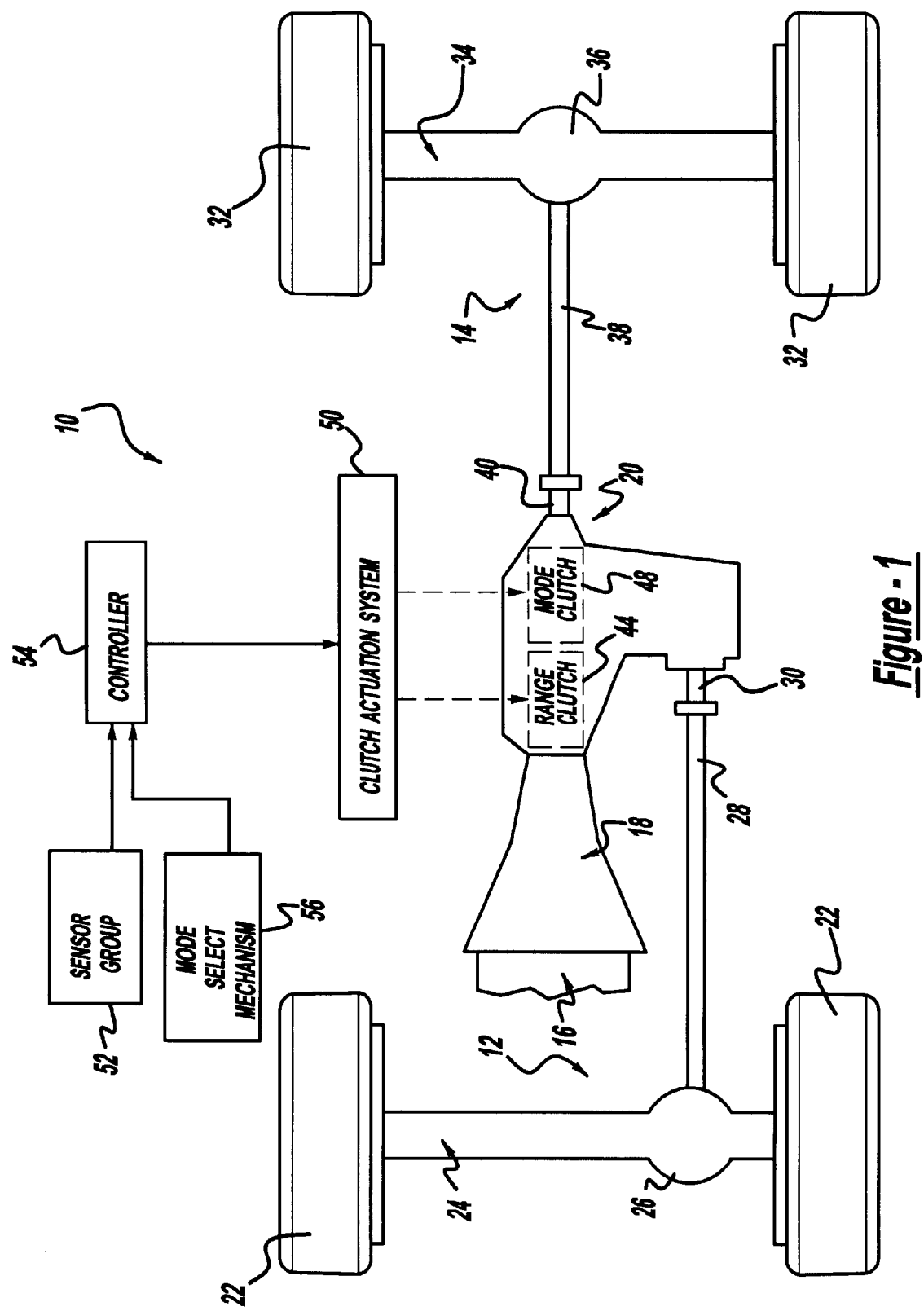
FIG. 1 is a schematic representation of a four-wheel drive motor vehicle equipped with the power transfer systems of the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with a two-speed planetary gearset 42, a range clutch assembly 44, an interaxle differential 46, and a mode clutch assembly 48. Range clutch assembly 44 is operable to couple components of planetary gearset 42 for driving an input member of interaxle differential 46 at either of a first (i.e., high-range) or second (i.e., low-range) speed ratio. Additionally, mode clutch assembly 48 is operable to control the magnitude of speed differentiation and torque biasing between rear output shaft 40 and front output shaft 30. Power transfer system 10 further includes a power-operated clutch actuation system 50 for controlling actuation of range clutch assembly 44 and mode clutch assembly 48, a sensor group 52 for sensing specific dynamic and operational characteristics of the motor vehicle and generating sensor input signals indicative thereof, and a controller 54 for generating control signals in response to the sensor input signals. Power transfer system 10 also includes a mode select mechanism 56 for permitting the vehicle operator to select one of the available drive modes. In particular, controller 54 controls clutch actuation system 50 in response to a mode signal sent to controller 54 from mode select mechanism 52 that is indicative of the particular mode selected. When an "adaptive" four-wheel drive mode is selected, controller 54 operates to continuously monitor and automatically regulate the actuated condition of mode clutch assembly 48 between its non-actuated and fully-actuated limits for varying the magnitude of speed differentiation and torque transfer between output shafts 30 and 40. However, when the mode signal indicates that a "locked" four-wheel drive mode has been selected, mode clutch assembly 48 is fully actuated, whereby non-differentiated power is delivered to output shafts 30 and 40. The locked four-wheel drive mode is provided for permitting improved traction when the motor vehicle is operated off-road or on severe road conditions.

Figure 2:
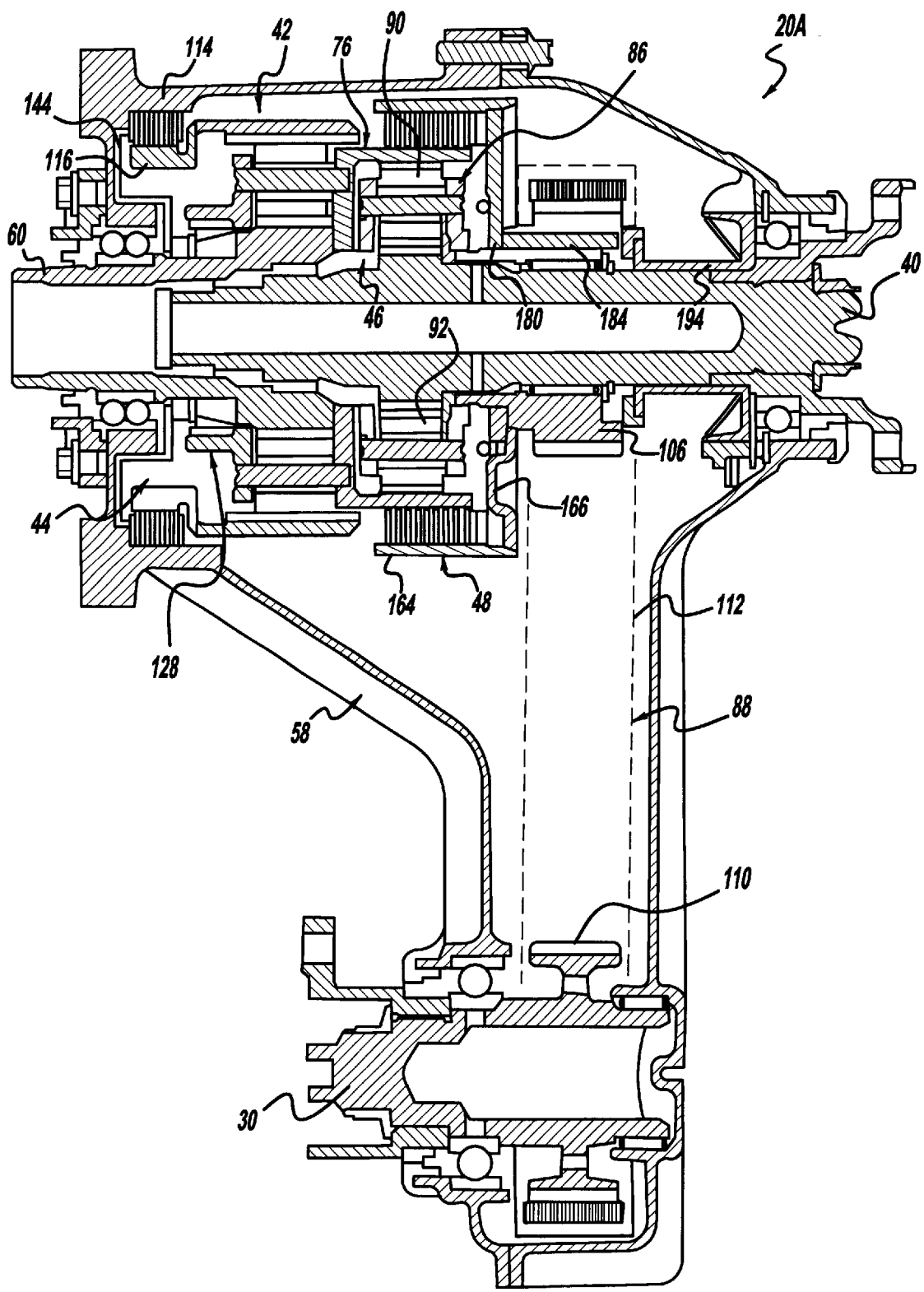
FIG. 2 is a sectional view of a full-time transfer case constructed according to one preferred embodiment of the present invention.
Figure 3:
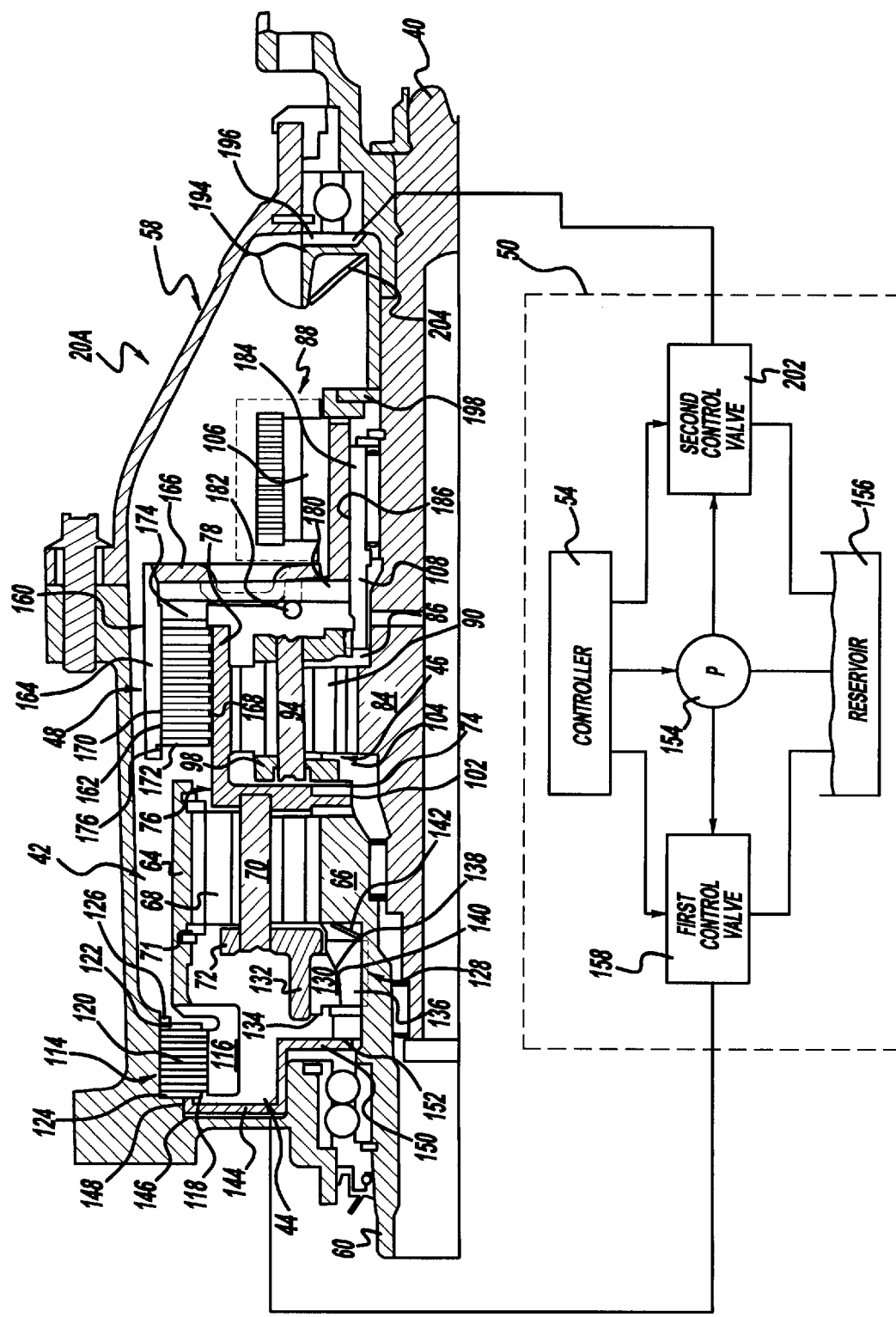
FIG. 3 is an enlarged partial sectional view taken from FIG. 2 showing the components associated with the range clutch assembly and the mode clutch assembly in greater detail.

With particular reference now to FIGS. 2 and 3, one preferred construction for a full-time transfer case 20A will now be described. Transfer case 20A includes a housing assembly 58 and an input shaft 60 rotatably supported from housing assembly 58. Input shaft 60 is adapted for connection to an output shaft (not shown) of transmission 18 such that both are rotatably driven by engine 16 of the motor vehicle. As seen, rear output shaft 40 is rotatably supported between input shaft 60 and housing assembly 58 while front output shaft 30 is rotatably supported from housing assembly 58. Planetary gearset 42 includes a first ring gear 64, a first sun gear 66 fixed for rotation with input shaft 60, and a set of first pinion gears 68 which are each rotatably supported on a pinion shaft 70 and meshed with first sun gear 66 and first ring gear 64. First ring gear 64 is axially constrained by thrust rings 71 relative to pinion gears 68. Each pinion shaft 70 extends between a front carrier ring 72 and a rear carrier ring 74 which are interconnected to define a planet carrier 76. As seen, a second ring gear 78 extends from rear carrier ring 74 of planet carrier 76 and acts as the input to interaxle differential 46.

Planetary gearset 42 functions as a two-speed gear reduction unit which, in conjunction with range clutch assembly 44 is operable to establish first and second drive connections between input shaft 60 and second ring gear 78. To establish the first drive connection, planet carrier 76 is coupled by range clutch assembly 44 for common rotation with input shaft 60. Thus, the first drive connection defines a high-range drive mode in which second ring gear 78 is driven at a first (i.e., direct) speed ratio with respect to input shaft 60. In contrast, the second drive connection is established by range clutch assembly 44 coupling first ring gear 64 to housing assembly 58. Thus, the second drive connection defines a low-range drive mode in which second ring gear 78 is driven at a second (i.e., reduced) speed ratio relative to input shaft 60.

Interaxle differential 46 functions to permit speed differentiation and distribute drive torque between front output shaft 30 and rear output shaft 40 so as to establish a differentiated or "full-time" four-wheel drive mode. As noted, second ring gear 78, when driven at either of the first and second speed ratios, acts as the input to interaxle differential 46. Interaxle differential 46 also includes a planetary gearset with outputs operably coupled to front output shaft 30 and rear output shaft 40. According to the particular embodiment shown, this gearset includes a second sun gear 84 fixed for rotation with rear output shaft 40, a pinion carrier 86 coupled via a transfer mechanism 88 for rotation with front output shaft 30, a set of second pinions 90 rotatably supported from pinion carrier 86 and meshed with second sun gear 84, and a set of third pinions 92 rotatably supported from pinion carrier 86 and meshed with second ring gear 78. In addition, pinions 90 and 92 are arranged in meshed pairs and are supported on corresponding pinion posts 94 and 96 which extend between a front carrier plate 98 and a rear carrier plate 100 that are interconnected to define pinion carrier 86. As seen, thrust bearings 102 and 104 locate rear carrier ring 74 for rotation relative to first sun gear 66 and front carrier plate 98. Transfer mechanism 88 includes a drive sprocket 106 rotatably supported on rear output shaft 40 and which has a tubular hub segment 108 splined to rear carrier plate 100 of pinion carrier 86. Transfer mechanism 88 also includes a driven sprocket 110 fixed to front output shaft 30, and a power transfer device, such as chain 112, which interconnects driven sprocket 110 to drive sprocket 106.

With continued reference to FIGS. 2 and 3, range clutch assembly 44 is shown to include a first clutch pack 114 that is operably mounted between a drum 116 fixed to first ring gear 64 and housing assembly 58. Clutch pack 114 includes a set of inner clutch plates 118 splined to drum 116 and which are alternately interleaved with a set of outer clutch plates 120 splined to housing assembly 58. Clutch pack 114 is shown to be located between a reaction plate 122 and a pressure plate 124, both of which are splined to housing assembly 58. A snap ring 126 is provided to axially restrain and locate reaction plate 122 relative to housing assembly 58. Range clutch assembly 44 is also shown to include a spring-biased cone clutch 128 that is operably mounted between front carrier ring 72 and input shaft 60. Cone clutch 128 includes an outer clutch ring 130 that is fixed for rotation with an annular hub segment 132 of front carrier ring 72. A snap ring 134 axially restrains outer clutch ring 130 against a shoulder portion of front carrier ring 72. Cone clutch 128 also includes an inner clutch ring 136 that is splined to input shaft 60. Outer clutch ring 130 has a tapered aperture defining a frusto-conical inner surface 138 that is adapted to mate with a frusto-conical outer surface 140 of inner clutch ring 136. Preferably, a layer of friction material is bonded to one or both of conical surfaces 138 and 140, of the type used in synchronizer cones. Cone clutch 128 also includes a release spring 142 which is located between first sun gear 66 and a rear edge surface of inner clutch ring 136. Finally, range clutch assembly 44 includes a range piston 144 mounted in, and sealed relative to, a pressure chamber 146 formed in housing assembly 58. Range piston 144 is supported in pressure chamber 146 for axial movement relative to clutch pack 114 and cone clutch 128. Range piston 144 includes a first end segment 148 which acts on pressure plate 124 and a second end segment 150 which acts on a thrust bearing assembly 152. As seen, thrust bearing assembly 152 engages a front edge surface of inner clutch ring 136.

Clutch actuation system 50 is schematically shown to include a pump 154 which draws fluid from a reservoir 156 for supplying high pressure fluid to the inlet of a first control valve 158. First control valve 158 is actuated by controller 54 for controlling the fluid pressure in pressure chamber 146 for causing movement of range piston 144 between a high-range position and a low-range position. With range piston 144 in its high-range position, clutch pack 114 is released and cone clutch 128 is engaged. In contrast, movement of range piston 144 to its low-range position causes clutch pack 114 to engage while cone clutch 128 is released. Preferably, first control valve 158 is an electrically-actuated two-position valve that is operable in a first mode to interrupt fluid flow from pump 154 to pressure chamber 146 while permitting fluid to vent from pressure chamber 146 back to reservoir 156. With control valve 158 operating in its first mode, release spring 142 forcibly urges inner clutch ring 136 to slide axially in a forward direction to a locked position whereat its outer cone surface 140 is in taper-locked engagement with inner cone surface 138 of outer clutch ring 130. This axial movement of inner clutch ring 136 causes corresponding forward movement of range piston 144 to its high-range position which, in turn, results in movement of first end segment 148 to a retracted position for releasing clutch pack 128. Thus, with range piston 144 in its high-range position, planet carrier 76 is coupled for rotation with first sun gear 66 via the taper-lock of cone clutch 128 while first ring gear 64 is free to rotate relative to housing assembly 58. As such, the first drive connection is established and second ring gear 78 is driven for common rotation with input shaft 60.

Shifting of first control valve 158 into a second mode functions to interrupt communication between pressure chamber 146 and reservoir 156 while providing fluid communication from pump 154 to pressure chamber 146. With first control valve 158 operating in its second mode, the increased fluid pressure in pressure chamber 146 causes range piston 144 to move from its high-range position to its low-range position which, in turn, causes inner clutch ring 136 to slide axially in a rearward direction from its locked position to a released position in opposition to the biasing of release spring 142. Such movement of inner clutch ring 136 causes its outer cone surface 140 to be released from taper-locked engagement with inner cone surface 138 of outer clutch ring 130, thereby uncoupling planet carrier 76 from first sun gear 66. Additionally, movement of range piston 144 to its low-range position also causes first end segment 148 to move from the retracted position to an extended position for compressing first clutch pack 128 and braking rotation of first ring gear 64. Thus, with range piston 144 in its low-range position, first ring gear 64 is held stationary and the second drive connection is established with planet carrier 76 driven at a reduced speed relative to input shaft 60.

As best seen from FIG. 3, mode clutch assembly 48 is arranged for controlling speed differentiation and torque biasing between second ring gear 78 and pinion carrier 86 of interaxle differential 46. Mode clutch assembly 48 includes a multi-plate friction clutch having an outer drum 160 fixed for rotation with drive sprocket 106 and a second clutch pack 162 operably installed between outer drum 160 and second ring gear 78. In particular, outer drum 160 includes a cylindrical drum housing 164 that is fixed (i.e., welded) to a housing plate 166 which, in turn, is fixed (i.e., welded) to drive sprocket 106. Clutch pack 162 includes a set of inner clutch plates 168 splined to second ring gear 78 and which are alternately interleaved with a set of outer clutch plates 170 splined to drum housing 164. Clutch pack 162 is shown to be located between a reaction plate 172 splined to drum housing 164 and a pressure plate 174 journalled in drum housing 164. A snap ring 176 axially restrains and locates reaction plate 172 on drum housing 164. Movement of pressure plate 174 functions to vary the frictional compressive force exerted on clutch pack 162 for regulating speed differentiation and biasing the torque distribution between rear output shaft 40 and front output shaft 30.

With continued reference to FIGS. 2 and 3, mode clutch assembly 48 is also shown to include a set of lever arms 180 disposed adjacent to housing plate 166, a lever return spring 182 engaging lever arms 180, and a set of thrust pins 184 retained in throughbores 186 formed in drive sprocket 106. Lever arms 180 are equidistant and are retained for pivotal movement in radial channels formed in drum plate 166. Throughbores 186 are equally-spaced in a circumferential arrangement and are aligned with the radial channels in drum plate 166. As seen, an annular rim projection on pressure plate 174 engages an upper front face surface of each lever arm 180 while a first end of each thrust pin 184 engages a lower rear face surface of a corresponding lever arm 180. Thus, axially sliding movement of thrust pins 184 in a forward direction from a fully retracted position to a fully extended position causes lever arms 180 to pivot, in opposition to the biasing of lever return spring 182, from a first position to a second position. With lever arms 180 in the first position, pressure plate 174 exerts a predetermined minimum clutch engagement force on clutch pack 162. In contrast, when lever arms 180 are in the second position, pressure plate 174 exerts a predetermined maximum clutch engagement force on clutch pack 162. Mode clutch assembly 48 also includes a mode piston 194 mounted in and sealed relative to a pressure chamber 196 formed in housing assembly 58, and a thrust bearing assembly 198. Thrust bearing assembly 198 is disposed between an end segment 200 of mode piston 194 and a second end of each thrust pin 184. Thus, axial movement of node piston 194 causes corresponding axial movement of thrust pins 184 which, as noted, functions to pivot lever arms 180 for controlling the clutch engagement force applied to clutch pack 162.

Clutch actuation system 50 includes a second control valve 202 which is operable under the control of controller 54 to regulate the fluid pressure in pressure chamber 196 for causing movement of mode piston 194 between a released position and a locked position. Preferably, second control valve 202 is a variable flow control valve arranged between pump 154 and reservoir 156 for regulating the fluid pressure in pressure chamber 196 as a function of control signals sent by controller 54 and which are generated based on the mode and sensor input signals. When a minimum pressure control signal is sent to second control valve 202, pressure chamber 196 is vented to reservoir 156 and a piston return spring 204 urges mode piston 194 toward its released position. With mode piston 194 in its released position, return spring 182 biases lever arms 180 to the first position and thrust pins 184 to the fully retracted position. As such, the minimum clutch engagement force is applied to clutch pack 162 and mode clutch assembly 48 is considered to be in a non-actuated condition such that a differentiated or "full-time" four-wheel drive mode is established. In contrast, when a maximum pressure control signal is sent to second control valve 202, a maximum fluid pressure is supplied to pressure chamber 196 which causes mode piston 194 to move toward its locked position. Such movement of mode piston 194 causes thrust pins 184 to move toward the fully extended position and lever arms 180 to move toward the second position. Accordingly, with mode piston 194 in its locked position, the maximum clutch engagement force is applied to clutch pack 162 and mode clutch assembly 48 is considered to be in a fully-actuated condition for establishing a non-differentiated or "locked" four-wheel drive mode.

Transfer case 20A is operable to establish six distinct operative four-wheel drive modes including full-time four-wheel high-range and low-range drive modes, adaptive four-wheel high-range and low-range drive modes, and locked four-wheel high-range and low-range drive modes. The particular drive mode selected is established by the position of range piston 144 and mode piston 194. In operation, the vehicle operator selects one of the available drive modes via actuation of mode select mechanism 52 which, in turn, sends a corresponding mode signal to controller 54. Thereafter, controller 54 sends appropriate control signals to first control valve 158 and second control valve 202. When the full-time four-wheel high-range drive mode is selected, range piston 144 is moved to its high-range position and mode piston 194 is moved to its released position. When the locked four-wheel high-range drive mode is selected, range piston 144 is moved to its high-range position while mode piston 194 is moved to its locked position. When the full-time four-wheel low-range drive mode is selected, range piston 144 is moved to its low-range position while mode piston 194 is moved to its released position. When the locked four-wheel low-range drive mode is selected, range piston 144 is moved to its low-range position while mode piston 194 is moved to its locked position.

When one of the adaptive four-wheel drive modes is selected, mode clutch assembly 48 is actively controlled for providing automatic control of speed differentiation and torque biasing between output shafts 30 and 40. In particular, the actuated state of second control valve 202 is continuously modulated to vary the location of mode piston 194 relative to clutch pack 162 in accordance with specific predefined relationships that are established based on the current value of the sensor input signals. As such, the magnitude of the clutch engagement force applied to mode clutch pack 162 can be modulated in a manner that is independent of any deliberate action on the part of the vehicle operator. As will be appreciated, controller 54 is operable to regulate the control signals sent to second control valve 202 which, in turn, causes corresponding regulation of the fluid pressure in pressure chamber 196 for adjustably controlling the location of mode piston 194 between its released and locked positions. While transfer case 20A has been disclosed to be capable of providing six different drive modes, it is contemplated that most vehicle applications would limit the number of available drive modes. For example, mode select mechanism 52 could easily be adapted to permit selection of three drive modes, namely, the adaptive and locked four-wheel high-range drive modes and the locked four-wheel low-range drive mode.

Mode select mechanism 52 can take the form of any mode selector device under the control of the vehicle operator and which functions to generate a mode signal indicative of the specific drive mode selected. In one form, the mode selector device may be an array of dash-mounted push button switches. Alternatively, the mode selector device may be a manually-operable shift lever sequentially movable between a plurality of positions corresponding to the available operational drive modes which, in conjunction with a suitable electrical switch arrangement, generates a mode signal indicating the particular drive mode selected. In either form, mode select mechanism 52 offers the vehicle operator the option of deliberately choosing between the various operative drive modes.

Figure 4:
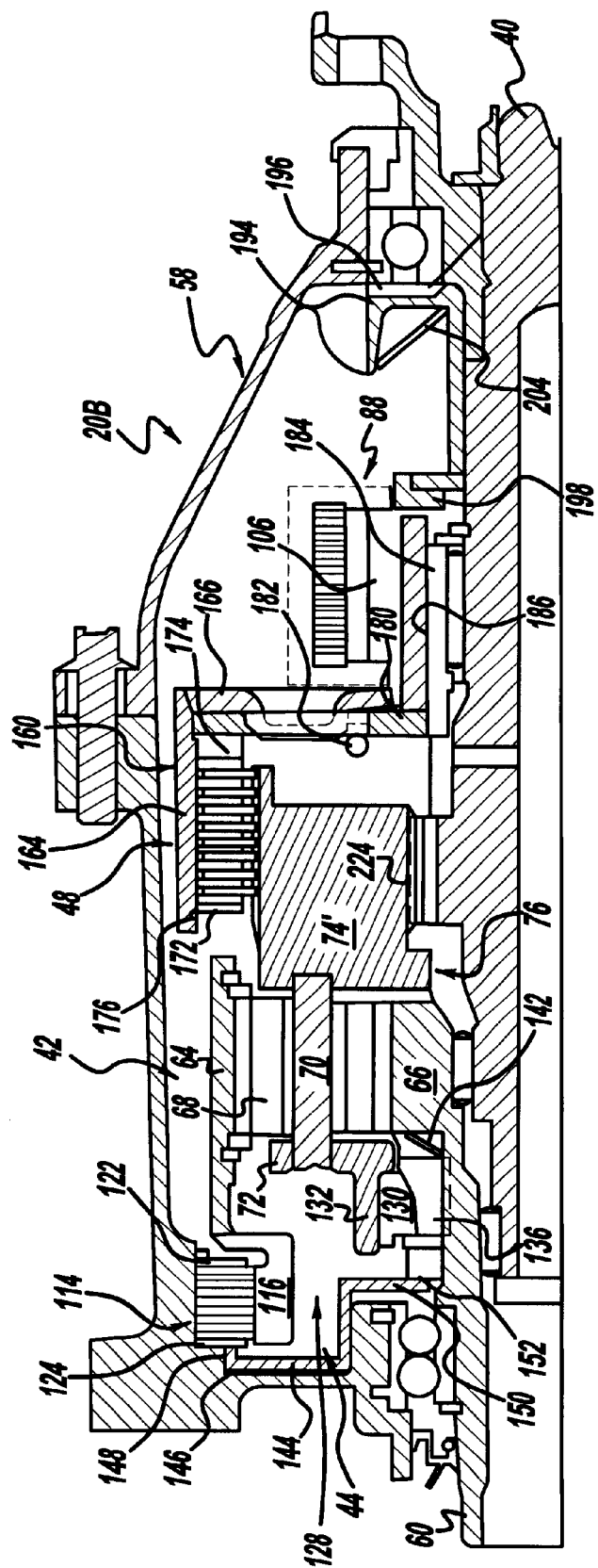
FIG. 4 is a partial sectional view of an on-demand transfer case constructed according to another preferred embodiment of the present invention.

With particular reference now to FIG. 4, a transfer case 20B is shown which is a modified version of transfer case 20A with interaxle differential 46 removed to define an "on-demand" power transfer system. Transfer case 20B is operable to make available at least six different drive modes. These include a two-wheel high-range drive mode, an on-demand four-wheel high-range drive mode, a part-time high-range drive mode, a two-wheel low-range drive mode, an on-demand four-wheel low-range drive mode, and a part-time four-wheel low-range drive mode. To provide these drive modes, rear carrier ring 74' of planet carrier 76 is shown fixed via a splined connection 224 to rear output shaft 40. As such, drive torque is transferred from planetary gearset 42 to rear output shaft 40 to define the high-range and low-range modes while mode clutch assembly 48 is arranged to transfer drive torque from rear output shaft 40 to front output shaft 30 for establishing the available four-wheel drive modes. As will be appreciated, the two-wheel drive modes are established with mode piston 194 in its released position such that all drive torque is directed to rear output shaft 40. In contrast, the part-time four-wheel drive modes are established with mode piston 194 in its locked position such that drive sprocket 106 is coupled to planet carrier 76 and the drive torque is split evenly between output shafts 30 and 40. Finally, when one of the on-demand four-wheel drive modes is selected, mode clutch assembly 48 is actively controlled for automatically modulating the clutch engagement force exerted on second clutch pack 162 which functions to regulate the amount of drive torque that is transferred to front output shaft 30. Again, the actuated state of mode clutch assembly 48 is controlled as a function of predefined relationships established based on the sensor input signals.

Figure 5:
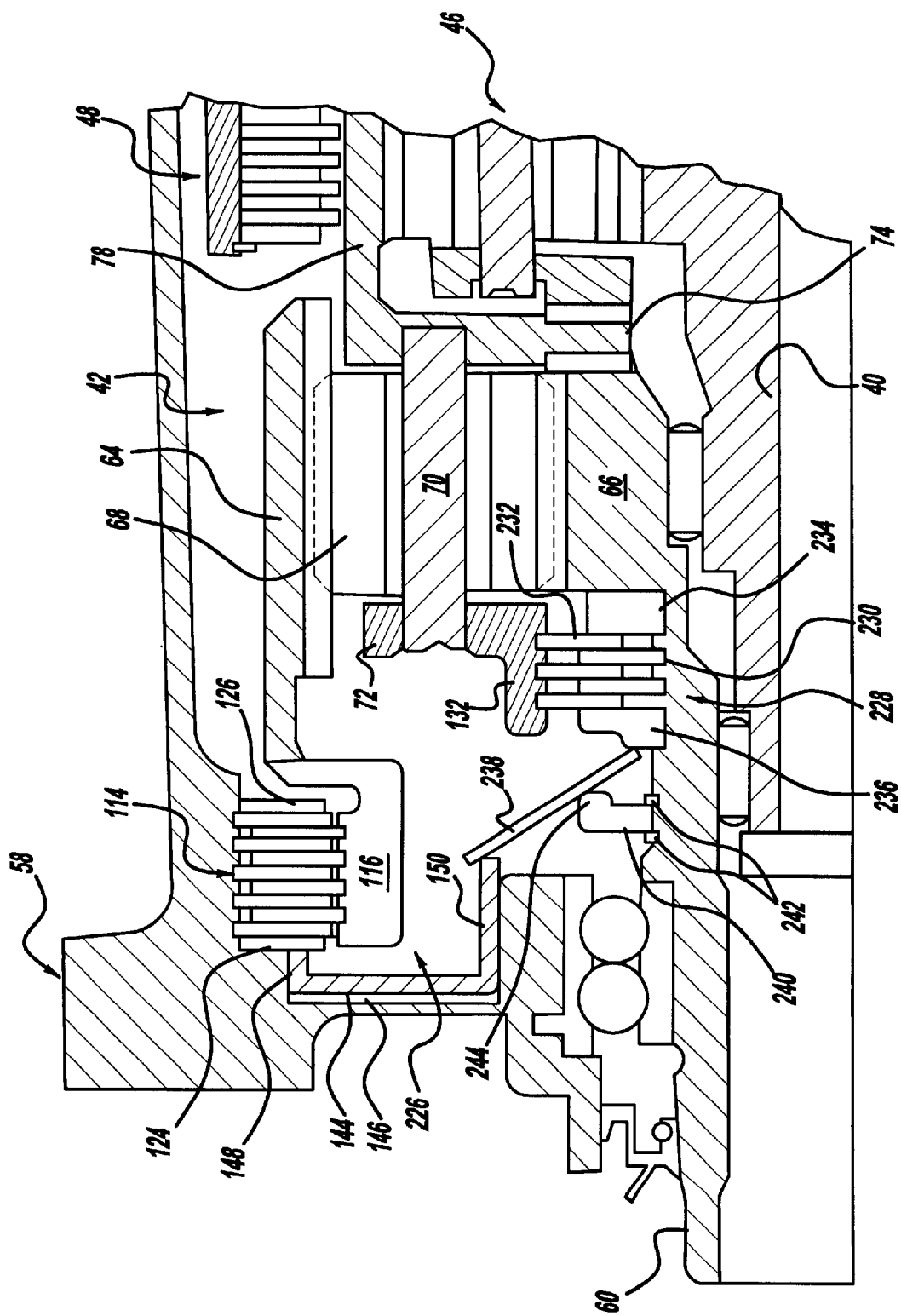
FIGS. 5 through 7 are partial sectional views showing alternative constructions for the range clutch assembly.

Referring now to FIG. 5, a range clutch assembly 226 is shown which can be incorporated into either of full-time transfer case 20A or on-demand transfer case 20B in substitution for range clutch assembly 44. In general, range clutch assembly 226 has many components common to range clutch assembly 44 except that cone clutch 128 has been replaced with a third clutch pack 228 that is mounted between front carrier ring 72 and input shaft 60. Clutch pack 228 includes a set of inner clutch plates 230 splined to input shaft 60 and which are interleaved with a set of outer clutch plates 232 splined to hub segment 132 of front carrier ring 72. Clutch pack 228 is shown to be located between a reaction plate 234 and an apply plate 236, both of which are splined to input shaft 60. A disc spring 238 is disposed between apply plate 236 and a retainer ring 240 which is mounted on input shaft 60 and axially located thereon by snap rings 242. Disc spring 238 is arranged such that its intermediate segment engages a flange 244 on retainer ring 240 while second end segment 150' of range piston 144 engages its outer peripheral edge and apply plate 236 engages its inner peripheral edge.

As with the other range clutch assemblies, clutch actuation system 50 is used to control actuation of range clutch assembly 226 with first control valve 158 again operating to control movement of range piston 144 between its high-range and low-range positions. When range piston 144 is in its high-range position, first clutch pack 114 is released and third clutch pack 228 is engaged. In particular, disc spring 238 causes apply plate 236 to slide rearwardly to a locked position for applying a compressing clamping force on third clutch pack 228. Thus, planet carrier 76 is coupled for common rotation with input shaft 60 while first ring gear 64 is free to rotate relative to housing assembly 58 for establishing the high-range drive mode. In contrast, movement of range piston 144 to its low-range position functions to engage first clutch pack 114 and release third clutch pack 228. Specifically, such rearward movement of range piston 144 causes disc spring 238 to pivot at flange 244 for permitting apply plate 236 to slide in a forward direction to a released position whereat planet carrier 76 rotates freely relative to input shaft 60. As before, such movement of range piston 144 to its low-range position functions to compress first clutch pack 114 and brake rotation of first ring gear 64.

Figure 6:
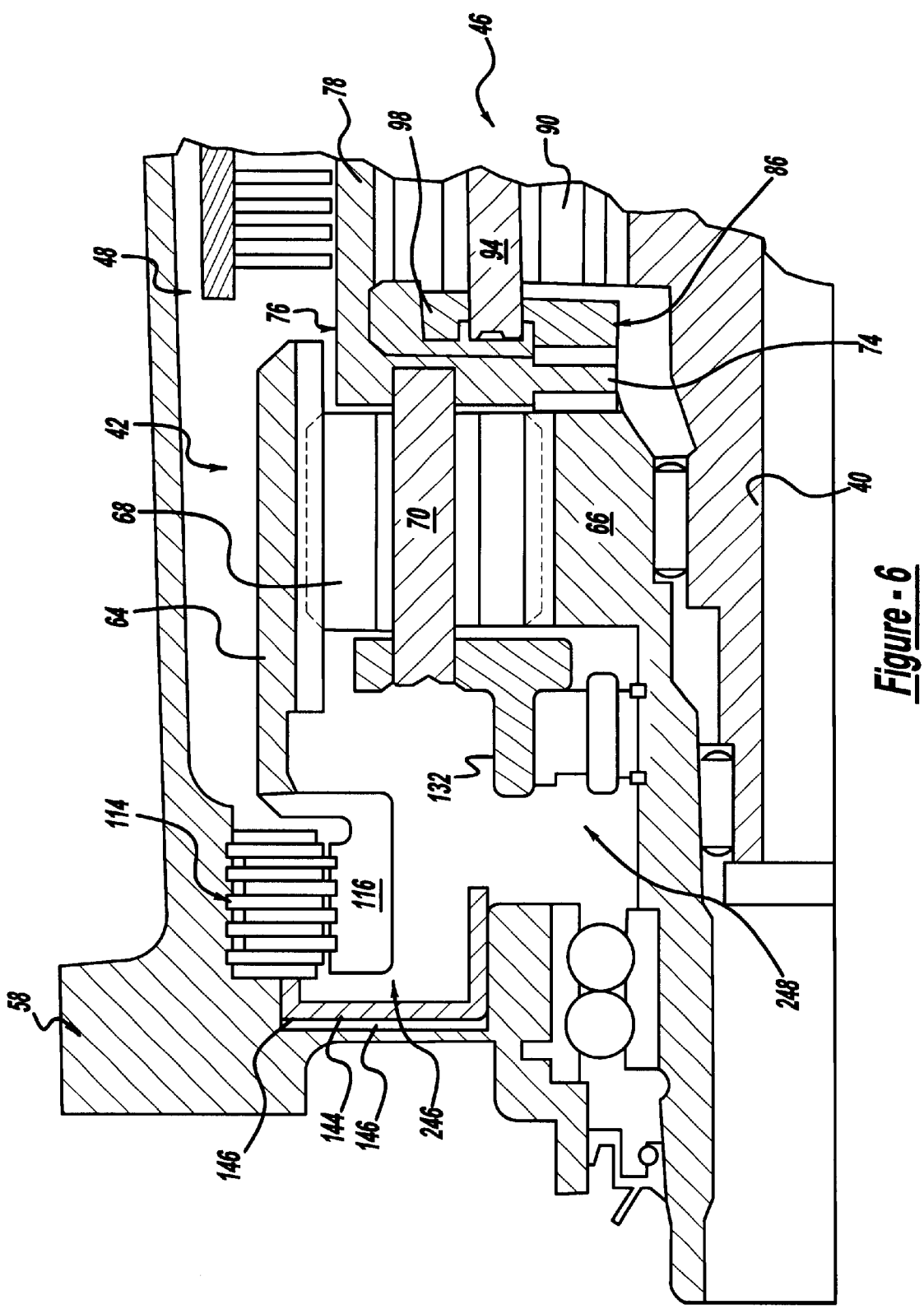

Referring now to FIG. 6, a range clutch assembly 246 is shown which can be integrated into either of full-time transfer case 20A or on-demand transfer case 20B in substitution for range clutch assemblies 44 and 226. In particular, an over-running type lock-up clutch 248 is shown mounted between hub segment 132 of front carrier ring 72 and input shaft 60. In this arrangement, range piston 144 does not actuate lock-up clutch 248, but is only operable to actuate first clutch pack 114. When range piston 144 is in its high-range position, first clutch pack 114 is released and lock-up clutch 248 is engaged. More specifically, planet carrier 76 is coupled by lock-up clutch 248 for common rotation with input shaft 60 while first ring gear 64 is free to rotate relative to housing assembly 58 for establishing the high-range drive mode. In contrast, movement of range piston 144 to its low-range position functions to engage first clutch pack 114 and release lock-up clutch 248, whereby the low-range drive mode is established. Lock-up clutch 248 can be of the sprag or roller type.

Figure 7:
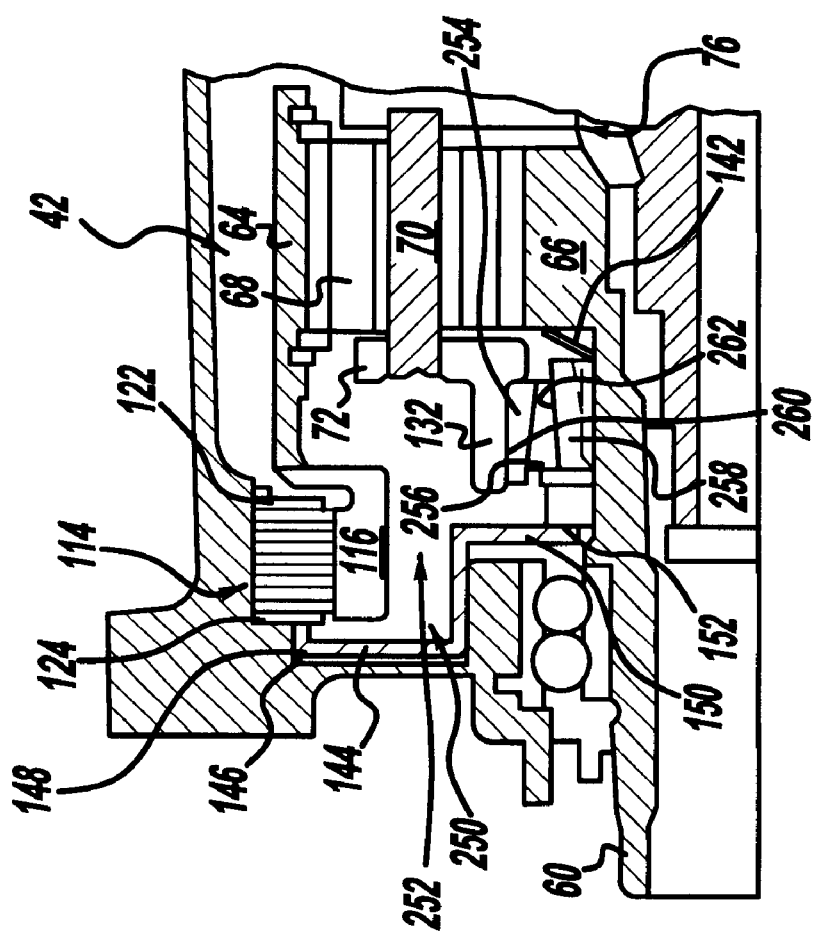

With particular reference now to FIG. 7, a range clutch assembly 250 is shown which can be installed in either of full-time transfer case 20A or on-demand transfer case 20B. In particular, range clutch assembly 250 includes first clutch pack 114 and a spring-biased bi-directional roller clutch 252 that is operably mounted between front carrier ring 72 and input shaft 60. Roller clutch 252 includes an outer race 254, tapered rollers 256, and inner race 258. Outer race 254 is fixed for rotation with hub segment 132 of front carrier ring 72 and has a tapered aperture defining a frusto-conical inner surface 260. Likewise, inner race 258 is splined to input shaft 60 and has a frusto-conical outer surface 262. Tapered rollers 256 are retained in a cage (not shown) that is fixed to outer race 254, with rollers 256 mating with inner conical surface 260 on outer race 254 and outer conical surface 262 on inner race 258. A release spring 142 is located between first sun gear 66 and a rear edge surface of inner race 258. As seen, second end segment 150 of range piston 140 acts on thrust bearing assembly 152 which, in turn, acts on a front edge surface of inner race 258. In a manner substantially similar to cone clutch 128, controller 54 actuates first control valve 158 to control the supply of fluid to pressure chamber 146 for controlling movement of range piston 140 between its high-range and low-range positions which, in turn, causes corresponding movement of inner race 258 between a locked position and a released position. In particular, movement of range piston 140 to its high-range position causes release spring 142 to forcibly urge inner race 258 to slide axially relative to input shaft 60 in a forward direction to its locked position whereat tapered rollers 256 are wedged (i.e., clamped) between tapered surfaces 260 and 262. This wedging action results in outer race 254 being frictionally coupled to inner race 258, whereby planet carrier 76 is coupled for rotation with input shaft 60. In contrast, movement of range piston 140 to its low-range position causes inner race 258 to slide axially in a rearward direction to its released position in opposition to the biasing of release spring 142. Such movement of inner race 258 causes its outer conical surface 262 to release taper rollers 256 such that carrier 76 is permitted to rotate relative to input shaft 60. Thus, spring-biased roller clutch 252 is operable to establish a releasable taper-lock coupling between carrier 76 and input shaft 60.

Figure 8:
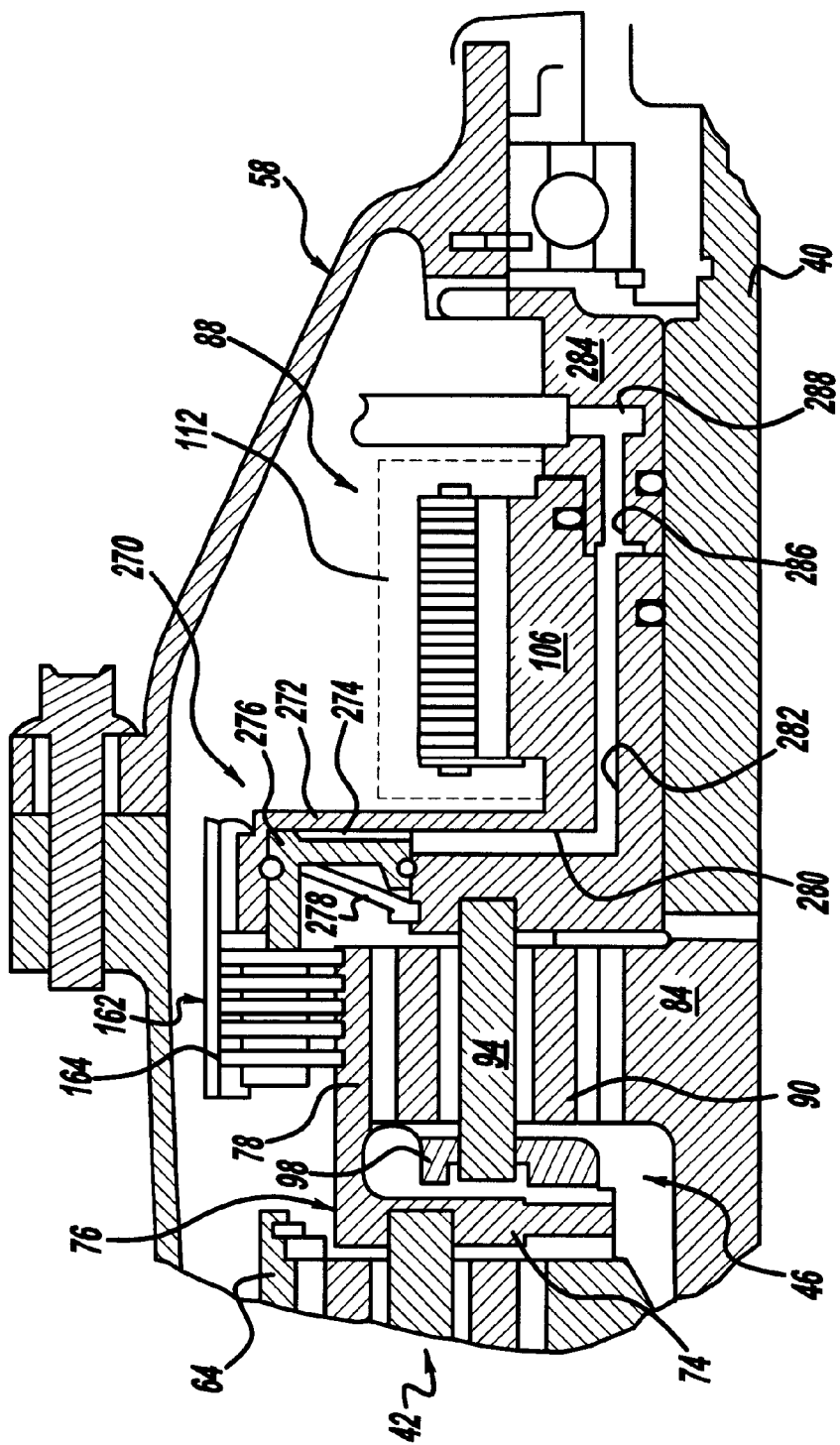
FIG. 8 is a partial sectional view showing an alternative construction for the mode clutch assembly.

Referring now to FIG. 8, an alternative construction is shown for a mode clutch assembly 270 which can be used with either of full-time transfer case 20A and on-demand transfer case 20B. In particular, a modified drive sprocket 106' is shown to now define a piston housing segment 272 which is splined to drum housing 164. An annular pressure chamber 274 is formed in piston housing segment 272. A mode piston 276 is mounted in pressure chamber 274 and is movable relative to second clutch pack 162 between a released position and a locked position. In addition, a piston return spring 278 urges mode piston 276 toward the released position whereat the minimum clutch engagement force is exerted on clutch pack 162. To provide means for moving piston 276 between its released and locked positions, one or more flow paths are formed in drive sprocket 106' which communicate with pressure chamber 274 and which include a radial passage 280 and an axial passage 282. A manifold 284 is journalled and sealed relative to rear output shaft 40 and drive sprocket 106'. Manifold 284 includes an inlet passage 286 and a port 288 providing fluid communication between second control valve 202 and the flow paths in drive sprocket 106'. In a manner substantially identical to that previously disclosed, second control valve 202 regulates the position of mode piston 276 between its released and locked positions for modulating the actuated condition of second clutch pack 162.

Clutch actuation system 50 can be arranged with pump 154 mounted within transfer case housing assembly 58 to draw fluid from an internal sump area defining reservoir 156 or, in the alternative, pump 154 and reservoir 156 can be located remote from the transfer case. In addition, separate pumps can be used to control independent actuation of the range and mode clutch assemblies. Sensor group 52 preferably includes sensors for detecting various vehicle operational characteristics including, for example, front shaft speed, rear shaft speed, vehicle speed, accelerator position, transmission gear position, and brake actuation. While any suitable control relationships can be established to automatically modulate actuation of the mode clutch assembly, it is contemplated that controller 54 regulates the fluid pressure delivered to pressure chambers 196 and 254 as a function of the magnitude of speed differentiation between front output shaft 30 and rear output shaft 40. In this regard, predetermined fluid pressure versus speed differential relationships can be programmed into controller 54 for automatically modulating the actuated condition of the mode clutch assembly.

The foregoing discussion discloses and describes the preferred structure and control systems for the present invention. However, one skilled in the art will readily recognize from such discussion and from the accompanying drawings and claims, that various changes, modifications and variations can be made therein without departing from the true spirit and fair scope of the invention as defined in the following claims.

What is claimed is:

1. A power transfer system for use in a four-wheel drive vehicle having a power source and first and second drivelines, comprising:

a transfer case having an input shaft receiving drive torque from the power source; a first output shaft connected to the first driveline; a second output shaft connected to the second driveline; a gearset having a first gear being a sun gear driven by said input shaft, a second gear being a ring gear, and a third gear being a pinion gear rotatably mounted on a carrier and which is meshed with said first and second gears; an interaxle differential having an input being driven by said carrier, a second ring gear fixed to said carrier, a first output being a second sun gear driving said first output shaft, and a second output being a second carrier driving a transfer mechanism coupled to said second output shaft; a range clutch assembly including a first clutch disposed between a stationary member and said second gear, a second clutch disposed between said input shaft and said carrier, and a range actuator operable in a first position to release said first clutch and lock said second clutch and further operable in a second position to lock said first clutch and release said second clutch, and a mode clutch assembly including a third clutch disposed between said differential input and said transfer mechanism and a mode actuator operable in a first position to release said third clutch and further operable in a second position to lock said third clutch;

sensors for detecting operational characteristics of the vehicle and generating sensor signals in response thereto;

a mode select mechanism permitting selection of an adaptive four-wheel high-range drive mode and a locked four-wheel low-range drive mode, said mode select mechanism generating a mode signal indicative of the particular drive mode selected; and a control system for moving said range and mode actuators in response to said sensor and mode signals, said control system is operable for moving said range actuator to its first position and modulating the position of said mode actuator between its first and second position as a function of said sensor signals when said adaptive four-wheel high-range drive mode is selected and said control system operable for moving said range actuator to its second position and said mode actuator to its second position when said locked four-wheel low-range drive mode is selected.

2. The power transfer system of claim 1 wherein said sensors determine a speed differential between said first and second output shafts, and wherein said control system modulates the position of said mode actuator in response to changes in the magnitude of said speed differential.

3. The power transfer system of claim 1 wherein said mode select mechanism further permits selection of a locked four-wheel high-range drive mode such that said control system causes said range actuator to move to its first position and said mode actuator to move to its second position.

4. The power transfer system of claim 1 wherein said range actuator includes a range piston supported in a pressure chamber, said range piston having a first segment acting on said first clutch and a second segment acting on said second clutch, and wherein said control system includes a source of hydraulic fluid, a pump, a control valve controlling the flow of fluid between said pump and said pressure chamber, and a controller for controlling actuation of said control valve, said control valve is operable in a first mode to vent fluid from said pressure chamber for causing said range piston to move to its first position, and said control valve is operable in a second mode to supply high pressure fluid from said pump to said pressure chamber for moving said range piston to its second position.

5. The power transfer system of claim 1 wherein said pinion gear is meshed with said sun gear and ring gear and rotatably supported from said carrier, said range actuator is operable in its first position to cause said first clutch to release said ring gear for rotation relative to said stationary member while causing said second clutch to lock said carrier for rotation with said input shaft, and said range actuator is operable in its second position to cause said first clutch to lock said ring gear to said stationary member while causing said second clutch to release said carrier for rotation relative to said input shaft.

6. The power transfer system of claim 5 wherein said first clutch is a clutch pack mounted between said ring gear and said stationary member, and said second clutch is a cone clutch having a first cone member fixed to said carrier and a second cone member supported for sliding movement on said input shaft, and wherein said range actuator acts on said clutch pack and said second cone member such that when said range actuator is moved to its first position, said clutch pack is released and said second cone member is moved into taper-locked engagement with said first cone member, and when said range actuator is moved to its second position it applies a clamping load on said clutch pack while said second cone member is moved out of taper-locked engagement with said first cone member.

7. The power transfer system of claim 6 wherein said first cone member has an inner conical surface adapted to mate with an outer conical surface on said second cone member, and wherein said second cone member is movable from a locked position to a released position in response to movement of said range actuator from its first position to its second position such that said outer conical surface of said second cone member is in taper-locked engagement with said inner conical surface of said first cone member when said second cone member is in its locked position, and said outer conical surface is released from taper-locked engagement with said inner conical surface when said second cone member is in its released position.

8. The power transfer system of claim 5 wherein said first clutch is a first clutch pack mounted between said ring gear and said stationary member, and said second clutch is a second clutch pack mounted between said carrier and said input shaft, and wherein said range actuator includes a range piston having a first segment engaging said first clutch pack and a second segment engaging a disc spring which engages said second clutch pack such that when said range piston is in its first position said first clutch pack is released and said disc spring exerts a clamping force on said second clutch pack, and when said range piston is in its second position said first segment exerts a clamping force on said first clutch pack and said second segment moves said disc spring to release said clamping force from said second clutch pack.

9. The power transfer system of claim 5 wherein said first clutch is a clutch pack interconnected between said ring gear and said stationary member, and said second clutch is an over-running clutch interconnecting said input shaft and said carrier.

10. The power transfer system of claim 1 wherein said transfer mechanism includes a drive sprocket journalled on said first output shaft, a driven sprocket fixed to said second output shaft, and a power transfer device coupling said driven sprocket to said drive sprocket, and wherein said third clutch is a clutch pack interconnected between said second ring gear and a drum housing fixed to said drive sprocket, and wherein said mode actuator includes a set of lever arms movable between a first position whereat a minimum clutch engagement force is exerted on said clutch pack and a second position whereat a maximum clutch engagement force is exerted on said clutch pack, a set of thrust pins supported in throughbores formed in said drive sprocket and having a first end contacting a corresponding one of said lever arms, and a mode piston disposed in a pressure chamber and having and end segment contacting a second end of thrust pins, whereby movement of said mode piston from a retracted position to an extended position causes corresponding movement of said lever arms from said first position to said second position.

11. The power transfer system of claim 10 wherein said control system includes a source of hydraulic fluid, a pump, a control valve for controlling the flow of fluid to said pressure chamber, and a controller for controlling actuation of said control valve, said controller operable to modulate the actuated condition of said control valve for moving said mode piston between its retracted and extended positions for modulating the clutch engagement force applied on said clutch pack as a function of said sensor signals.

12. The power transfer system of claim 11 further comprising a lever return spring for urging said lever arms toward the first position and a piston return spring for urging said mode piston toward its retracted position.

13. The power transfer system of claim 1 wherein said transfer mechanism includes a drive sprocket journalled on said first output shaft, a driven sprocket fixed to said second output shaft, and a power transfer device coupling said driven sprocket to said drive sprocket, and wherein said third clutch is a clutch pack interconnected between said second ring gear and said drive sprocket, and wherein said mode actuator includes a mode piston disposed in a pressure chamber formed in said drive sprocket and which is movable between a retracted position whereat a minimum clutch engagement force is exerted on said clutch pack and an extended position whereat a maximum clutch engagement force is exerted on said clutch pack.

14. The power transfer system of claim 13 wherein said control system includes a source of hydraulic fluid, a pump, a control valve for controlling the flow of fluid to said pressure chamber, and a controller for controlling actuation of said control valve, said controller operable to modulate the actuated condition of said control valve for moving said mode piston between its retracted and extended positions for modulating the clutch engagement force applied on said clutch pack as a function of said sensor signals.

* * * * *